United States Patent [19]

Evans et al.

[11] Patent Number: 5,510,602
[45] Date of Patent: Apr. 23, 1996

[54] ELECTRONIC SIGNAGE LABEL APPARATUS AND METHOD

[75] Inventors: James G. Evans, Colts Neck; R. Anthony Shober, Red Bank; Stephen A. Wilkus, Lincroft, all of N.J.

[73] Assignee: AT&T Corp., Murray Hill, N.J.

[21] Appl. No.: 170,563

[22] Filed: Dec. 20, 1993

[51] Int. Cl.⁶ .................................................. G06F 15/24
[52] U.S. Cl. ........................................... 235/385; 235/487
[58] Field of Search ...................................... 235/380, 383, 235/385, 487; 340/825.35

[56] References Cited

U.S. PATENT DOCUMENTS

| | | | |
|---|---|---|---|
| 4,415,065 | 11/1983 | Sandstedt | 235/383 X |
| 4,500,880 | 2/1985 | Gommersall et al. | 235/385 X |
| 4,521,677 | 6/1985 | Sarwin | 235/385 X |
| 4,654,514 | 3/1987 | Watson et al. | 235/385 |
| 4,888,709 | 12/1989 | Revesz et al. | 340/825.07 |
| 5,019,811 | 5/1991 | Olsson et al. | 340/825.17 |
| 5,354,979 | 10/1994 | Adelson et al. | 235/491 |

OTHER PUBLICATIONS

Smith, Ralph J., *Circuits, Devices, and Systems*, 1984 (no month), pp. 386–391.

*Primary Examiner*—Donald T. Hajec
*Assistant Examiner*—Steven Wigmore

[57] ABSTRACT

An electronic label device includes a display device and a microcomputer connected to control the display device. The microcomputer includes a memory having a plurality of registers. Data received via an antenna is stored in the registers. The microcomputer is indirectly controlled to selectively display data stored in the registers on said display device. The indirect control is effected by coupling signals to the said microcomputer without physical contact with elements of the label device, such as by a magnetic reed switch, capacitor coupling or inductive coupling.

24 Claims, 6 Drawing Sheets

ELECTRONIC SIGNAGE LABEL APPARATUS AND METHOD

FIELD OF THE INVENTION

This invention relates to improvements in electronic display apparatus and methods especially adapted to replace labels, such as pricing labels, for example pricing labels affixed to shelves in a retail store to communicate price information to a prospective purchaser. It will be apparent, of course, that the invention may have wider application, and is limited only by the scope of the claims.

BACKGROUND OF THE INVENTION

It is well known that, for example in grocery stores, paper labels are affixed to the front edges of shelves for the purpose of conveying pricing information, of items stacked on the shelves, to a prospective customer. Such labels only convey a limited amount of information, and changing of the information on the labels, i.e., changing the paper labels, can be time consuming, especially in a large store.

It has accordingly been proposed to replace such paper labels with electronic labels, i.e., electronic signage labels, upon which displayed pricing information can be readily modified from a central control station that may be located in an office in the store.

Figure 1:
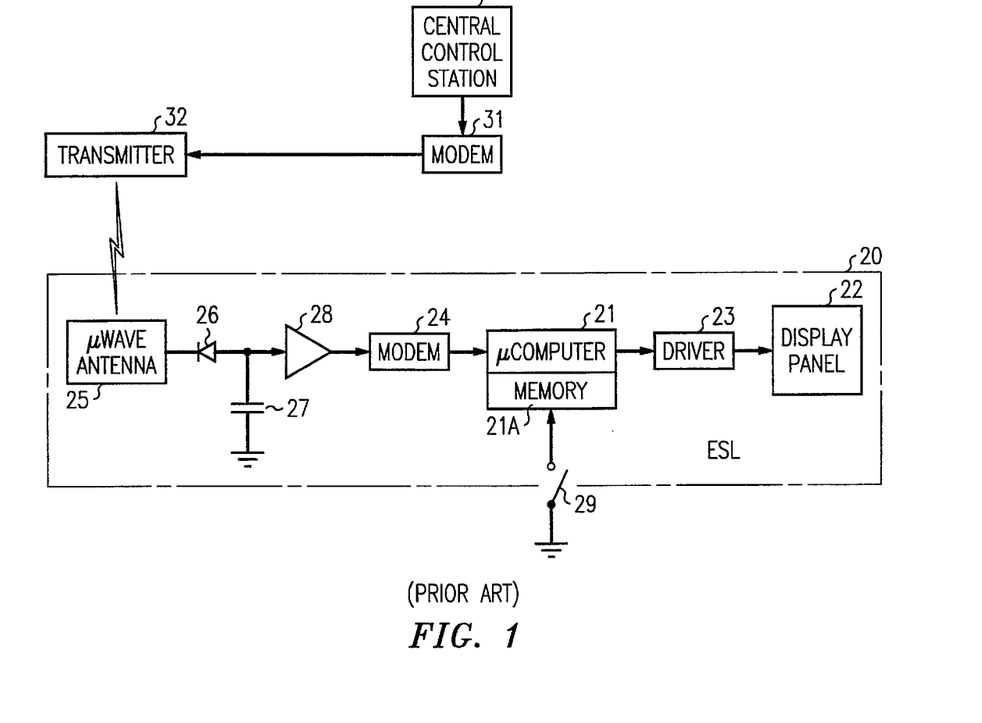
FIG. 1 is a block diagram of a proposed ESL system.

In one proposed electronic signage label (hereinafter referred to as an ESL) as illustrated in FIG. 1, the ESL 20 includes a microcomputer 21 (comprised for example of a microprocessor and suitable program and working memory) connected to control the display on a display panel 22 via a display driver 23. The display panel may be, for example, an LCD display panel. The microcomputer 21 receives pricing data from a modem 24. An antenna, such as microwave antenna 25 is coupled to a detector, such as the diode 26, for application of detected data to the modem 24. RF is bypassed by capacitor 27. It is, of course, apparent that suitable amplification stages 28 may be employed for the various signals. The microcomputer, modem and driver may be a digital IC.

The ESL of FIG. 1 further includes a central control station 30, which may be a microcomputer, the microcomputer being connected to output data to a modem 31 for application to a microwave transmitter 32. In operation, an operator at the central control station may input data into the microcomputer at this station, for transmission from the transmitter 32 via the modem 31. Such information is received at the ESL antenna 25, detected by the diode 26 for application to the modem 24, and applied to the microcomputer 21. The program of the microcomputer processes the received data, stores it, and controls the display of data on the display panel 22.

It is thus apparent that an ESL of the type discussed above enables the more efficient and rapid control of information in a store, so that, for example, the store operator can rapidly vary the listed price of any item in response to any requirement, such pricing information also being communicated, if desired, for example, to the cash registers in the store.

While I am aware that systems of the type of FIG. 1, as discussed above, are being currently developed and tested, I am not aware of their having been employed in any commercial use nor of their being the subject of any publicly available publication.

In a device of the type described with reference to FIG. 1, it is desirable to configure the ESL to have more functions than mere display of pricing information, especially since the microcomputer 21 has the capacity for the control of expanded functions in the device. For this purpose, as further illustrated in FIG. 1, a manually operable switch 29 may be connected to a port of the microcomputer. In one proposal, sequential manual operation of the switch effects sequential changes in the mode of operation of the ESL. For example, the microcomputer may have a memory 21A including a number of registers for storing different information, such as price information, inventory information, device serial number, etc. In this case, sequential operations of the switch 29 effect the sequential display of data in the different registers. For example, the microcomputer may have a default mode in which the pricing information is displayed, and be responsive to a first operation of the switch to control the display of inventory information (which has also been received from the central control station), and a further operation of the switch to control the display of a device serial number.

While the provision of such a switch enhances the functions of the ESL, it also creates mechanical problems. An ESL must be relatively small, for example having a height of about 1 inch, a width of about 2½ inches, and a depth of about ¼ inch, in order to enable it to be effectively mounted to the front edge of a shelf or on a bracket mounted on or adjacent the shelf. Since it is desirable for as much of the front of the ESL to be devoted to the display of information, to enable the prominent display of data, it is undesirable to mount the switch on the front of the device. The mounting of a manual switch to other parts of the ESL is also inconvenient, in view of the small size of the device and the necessity to mount the device to or adjacent the front edge of a shelf. The inconvenience of mounting the switch is also compounded by the fact that the switch should be weather proof, for example by being provided with a sealed rubber dome, in order to enable the use of the ESL in locations such as on freezer compartment shelves.

In addition, the prominent location of a manual switch subjects the ESL to the risk of having its mode changed by unauthorized persons, such as children and competitors.

It is further to be noted that, in the proposed ESL system illustrated in FIG. 1, the central control station must be able to selectively communicate with many ESLs, so that data may be selectively sent to the different devices. For this purpose, it has been proposed that each ESL have a serial number, and be capable of processing data only that has been transmitted in association with the respective serial number. When the serial number is uniquely permanently programmed into each ESL, it is apparent that care must be taken to ensure that a record is maintained of the exact location of the ESL with each serial number, so that proper data is sent to each ESL. In addition, if the record of the serial number of an ESL is lost, then such an ESL is no longer usable.

SUMMARY OF THE INVENTION

It is, therefore, an object of this invention to provide an electronic label device that overcomes the above discussed problems.

Briefly stated, in accordance with the invention, an electronic label device is provided that includes a display device, a microcomputer including memory and connected to control the display device. The memory includes a plurality of registers. An antenna is provided for receiving data for storage in the registers. Means are further provided for controlling the microcomputer to selectively display data stored in registers on said display device. The means for controlling comprises means for indirectly coupling signals to the label device, i.e., without physical contact therewith. The indirect coupling may be magnetic, for example employing a magnetic reed switch. Alternatively, the indirect coupling may be capacitive or inductive. The coupling is preferably sufficiently rapidly operating to enable the coupling of data to the label device.

The coupling of data or control signals to the label device, in accordance with the invention, enables the use of a coupling system that does not require use of the front or face of the device, and that does not require special waterproof sealing. In addition, the coupling system enhances the utility of the label device since it enables the local application of data to the registers of the device.

BRIEF DESCRIPTION OF THE FIGURES

In order that the invention may be more clearly understood, it will now be disclosed in greater detail with reference to the accompanying drawings, wherein.

DESCRIPTION OF THE PREFERRED EMBODIMENTS

The present invention is directed to improvements in an ESL, for example, of the type disclosed above with reference to FIG. 1, (with the exception of the manual switch 29), although it is not limited to the specific construction described with reference to FIG. 1. The term ESL, as employed in this disclosure, thus refers generally to an indicating device adapted to be mounted in association with goods, objects, etc., to convey pricing information about the goods, objects, etc., and to include a display device, a programmed logic circuit such as a microcomputer or microcontroller including memory, and an antenna input or the like to the logic circuit for receiving pricing information for display, from a remote location, preferably by wireless communication.

Figure 2:
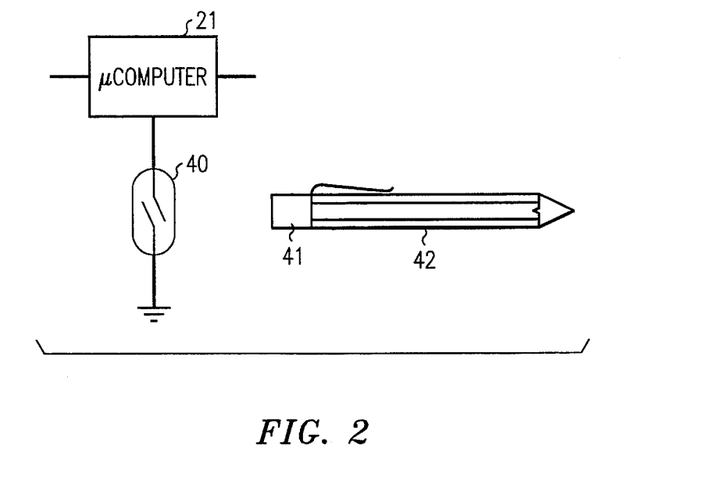
FIG. 2 is a block diagram of a portion of the ESL of FIG. 1, illustrating a modification thereof in accordance with the present invention.

FIG. 2 is a block diagram of a portion of the ESL of FIG. 1, in accordance with one embodiment of the invention. This embodiment of the invention differs from the ESL of FIG. 1 essentially only in that the manually operated switch 29 connected to a port of the microcomputer has been replaced by a magnetic reed switch 40. The reed switch 40 can be operated by a user held permanent magnet 41, which may be conveniently mounted on a pen or pencil 42. Accordingly, store personnel need only carry a simple pencil or pen mounted magnet on their persons in order to enable them to control the mode of the ESL, and therefore to control the display of the contents of any of the ESL registers on the display 22, i.e., to control the mode of operation of the microcomputer.

Figure 3:
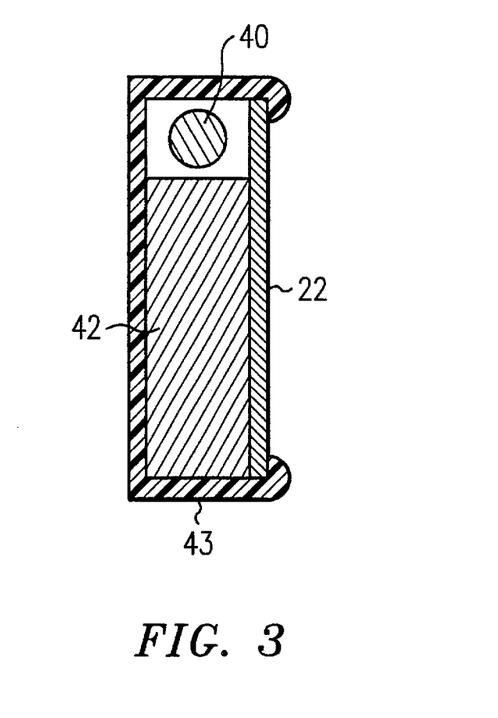
FIG. 3 is a cross sectional view of an ESL in accordance with the embodiment of FIG. 2.

The magnetic reed switch 40 need not be mounted to be exposed to the exterior of the ESL. For example, as illustrated in the cross sectional diagram of FIG. 3, the ESL may be comprised of an exposed display panel 22 and circuitry 42 mounted in a hermetically sealed casing 43. (The circuitry 42 may be the circuitry disclosed above with reference to FIG. 1). The reed switch 40 may be mounted internally of the ESL, i.e., within the casing 43. As a result, the display panel 22 may extend for substantially the full area of the front or face of the ESL.

Figure 4:
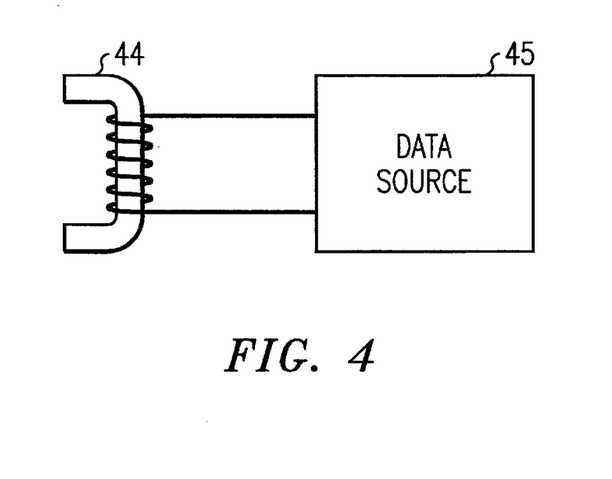
FIG. 4 is a simplified diagram of a modification of an actuator for the reed switch of FIG. 2.

The device for controlling the reed switch may be an electromagnet 44, as illustrated in FIG. 4, connected to receive signals from a data source 45. In accordance with the invention, since the magnetic reed switch 40 is capable of relatively rapid switching without failure for an extended period, the reed switch 40 may be employed in order to input further information or mode change commands into the ESL, in addition to merely changing the mode of operation of the microcomputer 21. For example, the registers of the microcomputer may be loaded via the electromagnet 44, a serial number may be programmed into the ESL via the electromagnet 44, etc. Thus, a large amount of data may be readily and rapidly entered into the ESL in this manner.

Figure 5:
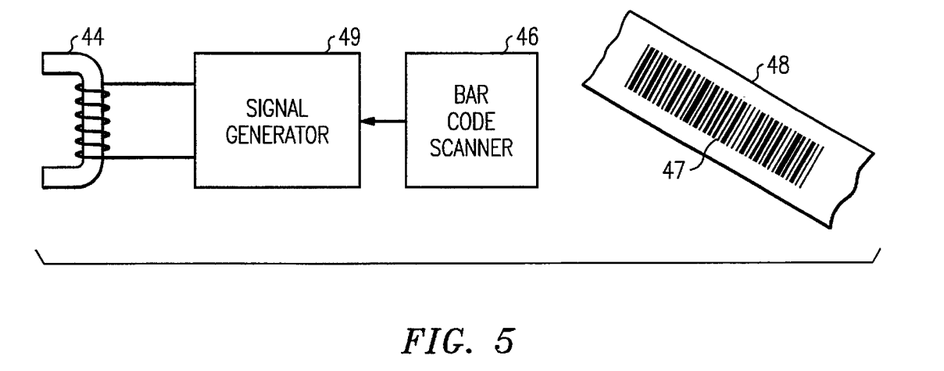
FIG. 5 is a simplified diagram of a further modification of an actuator for the reed switch of FIG. 2.

When data is entered via the electromagnet 44, the data may be coded so that the program of the microcomputer 21 recognizes those commands that are directed to the operational modes of the device, and data that is to be stored in the registers. The data source 45 may be any conventional data source, and may conveniently be a microcomputer device such as a laptop or notebook computer. As an alternative, as illustrated in FIG. 5, the data source may be comprised of a bar code scanner 46, for scanning preprinted bar codes 47 on a document 48. The output of the scanner 46 may be coded in a signal generator 49 for use in the ESL, and employed to energize the electromagnet 44. The structure illustrated in FIG. 5 may conveniently be fabricated in the form of a scanning gun.

It is thus apparent that many thousands of bits of data may be readily loaded into the ESL, employing devices of the type described with reference to FIGS. 4 and 5.

Figure 6:
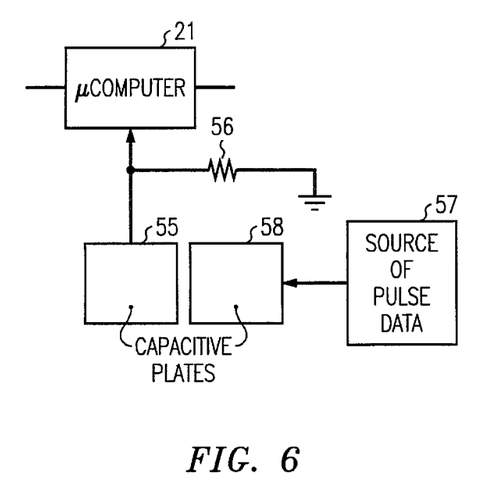
FIG. 6 is a block diagram illustrating a modification of the system of FIG. 2, wherein data and mode change commands are capacitively coupled to a port of the microcomputer.

The data and mode change commands may be applied to the ESL by other techniques than by a magnetic reed switch as illustrated in FIG. 2. Thus, as shown in FIG. 6, a capacitor plate 55 may be connected to a port of the microcomputer 21, the port being also connected to ground reference via a discharge resistor 56. In this embodiment of the invention, signals from a source 57 of data pulses are applied to a capacitor plate 58. Data from the source 57 may thus be capacitively coupled to the port of the microcomputer when the plate 58 is brought sufficiently close to the plate 55.

Figure 7:
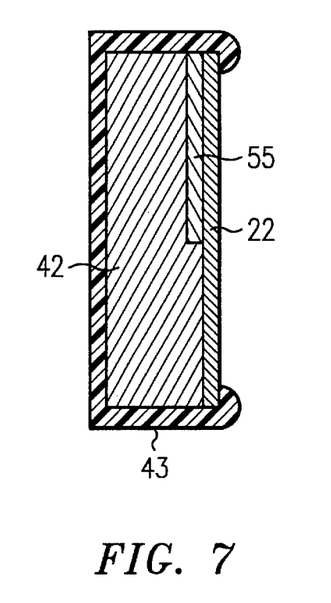
FIG. 7 is a cross sectional view of an ESL in accordance with the embodiment of FIG. 6.

As illustrated in FIG. 7, the capacitor plate 55 may readily be enclosed in the case 43, so that space on the front or face of the ESL is not required in order to couple commands and data to the ESL.

Figure 8:
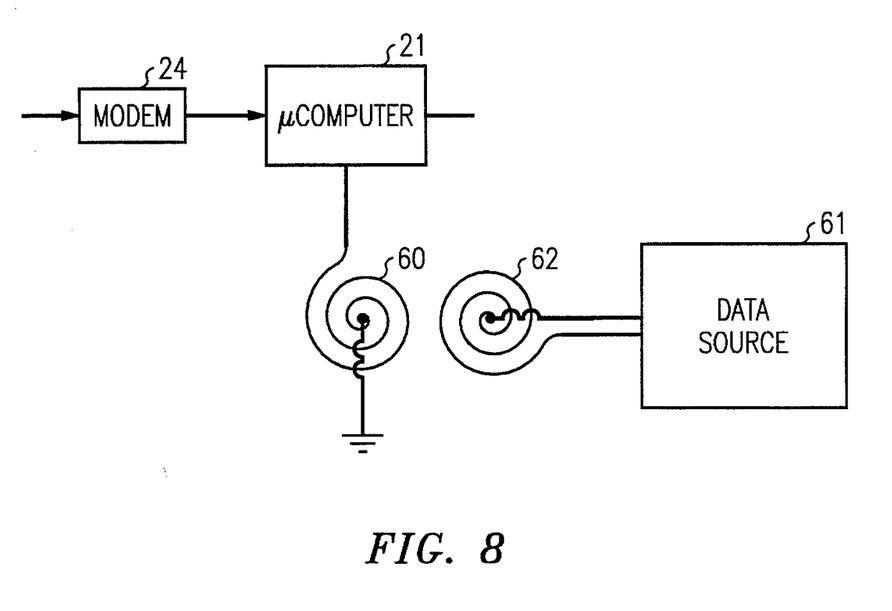
FIG. 8 is a block diagram illustrating a modification of the system of FIG. 2, wherein data and mode change commands are inductively coupled to the port of the microcomputer.

In a modification of the ESL of FIG. 8, a coil 60 is coupled to a port of the microcomputer 21. In this embodiment, the data and commands from a signal source 61 are inductively coupled to the port via a coil 62 connected to the data source, when the coil 62 is positioned sufficiently close to the coil 60.

Figure 9:
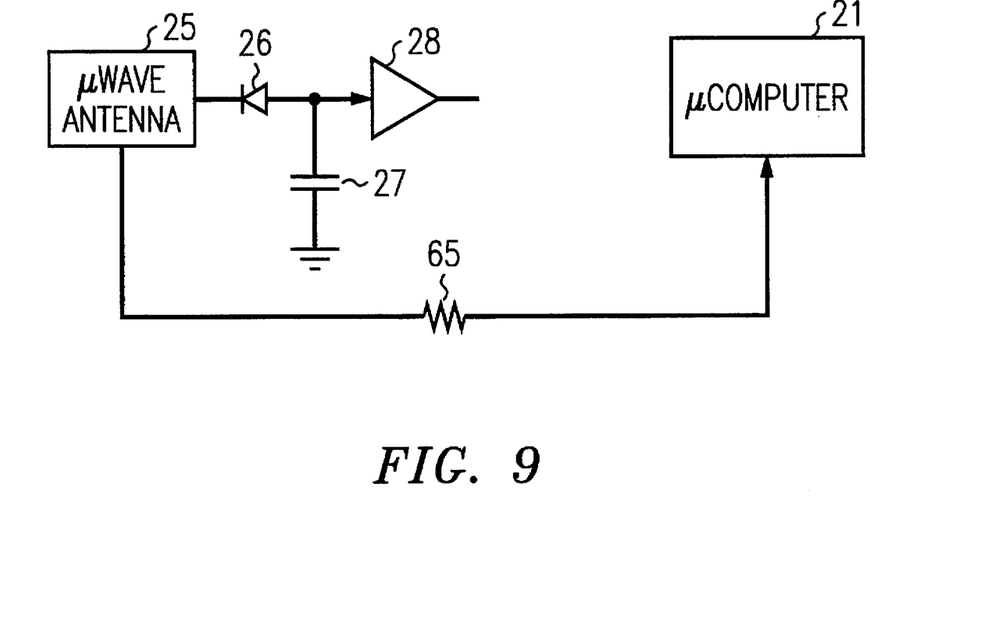
FIG. 9 is a block diagram of a modification of the ESL of FIG. 6, wherein the microwave antenna serves as a capacitor plate for coupling of mode change commands and data.

In a still further modification of the ESL of FIG. 6, as illustrated in FIG. 9, instead of providing a separate capacitor plate in the ESL for coupling in of data and commands, the microwave antenna may be employed to serve the function of the separate capacitor plate. In this instance, the antenna 25 is connected to the port of the microcomputer via an RF choke or high resistance 65.

Figure 10:
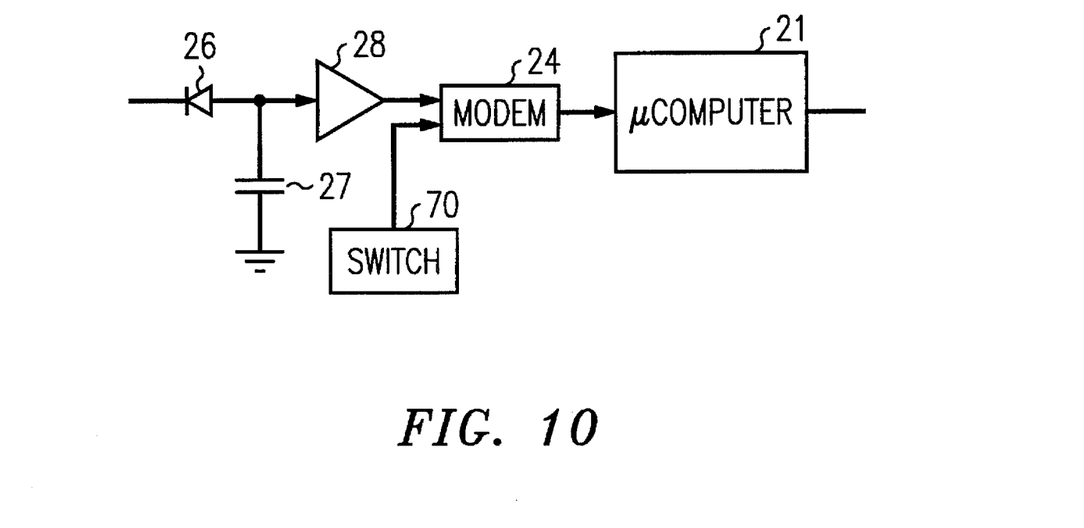
FIG. 10 is a further modification of an ESL in accordance with the invention, wherein data and mode change commands are applied to the modem.
Figure 11:
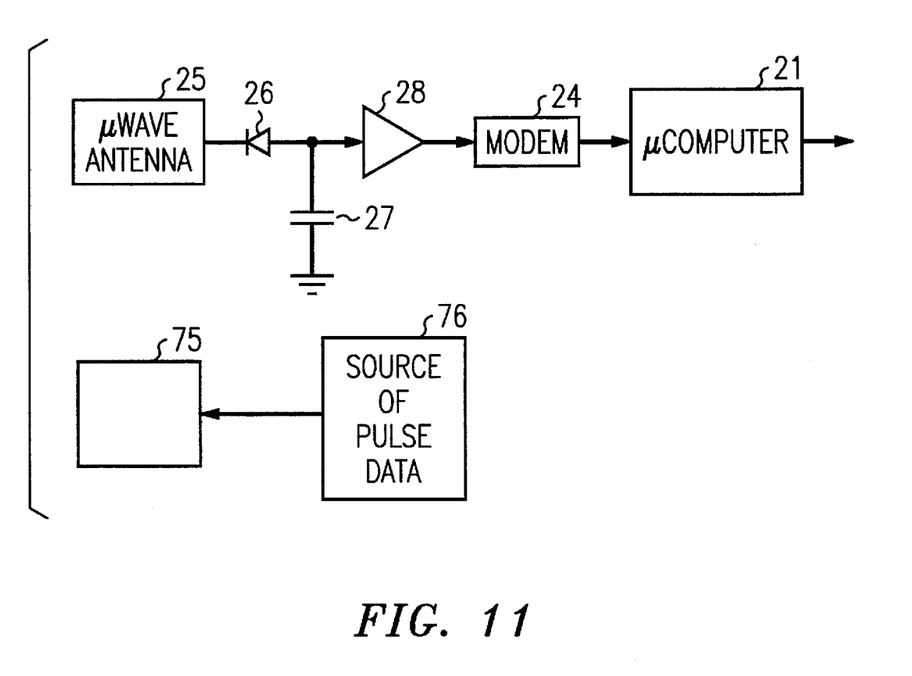
FIG. 11 is a still further modification of an ESL in accordance with the invention, wherein data and mode change commands are capacitively coupled to the microwave antenna.

In a still further embodiment of the invention, as illustrated in FIGS. 10 and 11, the data and commands may be applied to the ESL by other techniques than via a port of the microcomputer 21. Thus, as illustrated in FIG. 10, the switch 70 is coupled to apply data and commands directly to an input of the modem 24. The modem circuitry may be employed to acquire bit and frame synchronization for the switch serial data stream, in order to avoid duplication of digital logic. The switch 70 may be a reed switch as illustrated in FIG. 2. It is of course apparent that, alternatively, the commands and data may be capacitively or inductively coupled to the modem, for example employing techniques as described above with respect to FIGS. 6 and 8.

In the embodiment of the invention illustrated in FIG. 11, the microwave antenna 25 serves as a capacitor plate, as in the arrangement of FIG. 9. The antenna 25 is capacitively coupled to a capacitor plate 75 connected to receive data and command signals from a source of data pulses 76. Rather than directly couple the signals to a port of the microcomputer, however, as in the arrangement of FIG. 9, the signals capacitively coupled to the antenna are rectified by diode 26 and applied to the modem 24. The signals output by the data source 76, in this embodiment, are serial signals coded in accordance with the protocol of the modem.

In each of the embodiments of FIGS. 10 and 11, it is apparent that the signals from the data source are coded to enable the program of the microcomputer to identify and properly process the signals.

While the invention has been disclosed and described with reference to a limited number of embodiments it will be apparent that changes and modifications may be made therein, and it is therefore intended in the following claims to cover each such variation and modification as falls within the true spirit and scope of the invention.

What is claimed is:

1. An electronic label system for receiving and displaying data from a central controller comprising:

a display device having a display for display of display data thereon;

said display device having a controller including a memory having registers for storing said display data, said controller being connected to said display to selectively switch said display data from a selected one of said registers to said display to control the display of said display data;

said display device having first input means for receiving said display data from said central controller for storage in said registers, and a second input means for receiving signals and physically interfacing with said controller and means for controlling said controller via said second input means to selectively switch said selected display data in said selected one of said registers to said display for display thereon, said means for controlling being physically unconnected with and out of physical contact with said display device.

2. The electronic label system of claim 1 wherein:

said second input means includes a magnetic reed switch interfaced with said controller; and said local means for controlling includes a source of a magnetic field selectively applicable to a proximity of said magnetic reed switch to open and close said reed switch for effecting transmission of control signals for selecting said selected one of said registers.

3. The electronic label system of claim 2 wherein said source of a magnetic field is a permanent magnet.

4. The electronic label system of claim 2, wherein said source of a magnetic field is an electromagnet, and further comprising a source of data and control signals connected to energize said electromagnet, and said controller including means for responding to operation of said reed switch in response to said data signals to store data corresponding thereto in said memory.

5. The electronic label system of claim 4 wherein said source of data and control signals comprises a bar code scanner.

6. The electronic label system of claim 1 wherein said controlling means comprises a source of data and control signals, and means for capacitively coupling said data and control signals to said second input means.

7. The electronic label system of claim 1 wherein said controlling means comprises a source of data and control signals, and means for inductively coupling said data and control signals to said second input means for receiving.

8. An electronic label system for receiving and displaying data from a central controller comprising:

a display device having a display for display of display data thereon;

said display device having a controller including a memory having registers for storing said display data, said controller being connected to said display to selectively switch said display data from a selected one of said registers to said display to control the display of said display data;

said display device having a first input means for receiving said display data for storage in said registers end a second input means for interfacing with said controller to control selection of said selected one of said registers; and means for controlling said controller via said second receiving means to selectively switch said display data in said selected one of said registers to said display for display thereon, said means for controlling comprising a source of signals and magnetic coupling means for coupling said signals to said display device via said second receiving means.

9. The electronic label system of claim 8 wherein said second input means includes a magnetic reed switch connected to a port of said controller, and said magnetic coupling means includes a source of a magnetic field manually disposable to functionally couple with said reed switch.

10. The electronic label system of claim 9 wherein said source of a magnetic field is a permanent magnetic and said controller includes means for responding to operation of said reed switch for sequentially displaying display data in said registers on said display.

11. The electronic label system of claim 9 wherein said source of a magnetic field is an electromagnet, and said local means for controlling includes a source of data signals connected to energize said electromagnet, and said controller includes means for responding to operation of said reed switch for storing data corresponding to said data signals in at least one of said registers.

12. The electronic label system of claim 8 wherein said second input means includes a first coil connected to a port of said controller, and said magnetic coupling means includes a second coil movable into the proximity of said first coil, and a source of data signals connected to said second coil.

13. The electronic label system of claim 8 further comprising a modem connected to apply signals from said first and second input means to said controller.

14. An electronic label system for receiving and displaying data comprising:
- a display device having a display for displaying display data thereon;
- said display device having a controller including a memory having registers for storing said display data, said controller being connected to said display to selectively switch said display data from a selected one of said registers to said display to control the display of said display data;
- said display device having an input means for receiving said display data for storage in said registers; and
- means for controlling said controller to selectively switch said display data stored in said selected one of said registers to said display device for display thereon, said means for controlling comprising a source of signals and capacitive coupling means for coupling said signals to said display device.

15. The electronic label system of claim 14 wherein said display device includes a capacitive means for receiving signals from said capacitive coupling means for coupling said signals to a port of said controller.

16. The electronic label system of claim 14 further comprising said input means being an antenna and said display device including a modem connected to apply signals from said input means to said controller, and said capacitive coupling means applying said signals to an input of said modem via said input means.

17. The electronic label system of claim 14 wherein said capacitive coupling means comprises means for capacitively coupling signals to said input means and said input means including an antenna.

18. The electronic label system of claim 17 further comprising means for applying signals capacitively coupled to said antenna to a port of said controller.

19. An electronic label system comprising:
- a display device having a display for displaying display data thereon;
- a controller including a memory having registers for storing said display data, said controller being connected to said display to selectively switch display data from a selected one of said registers to said display to control the display of said display data;
- means for receiving said data for storage in said register;
- a source of said data and control signal; and
- means for applying said data and control signals to said controller, said controller being responsive to said control signals to selectively store said data in said registers and sequentially switch said display data stored in selected ones of said registers to said display for display thereon, said means for applying comprising means for magnetically coupling said signals to said display device.

20. An electronic label system comprising:
- a display device having a display for displaying display data thereon;
- said display device having a controller including a memory having registers for storing said display data, said controller being connected to said display device to selectively switch display data from a selected one of said registers to said display to control the display of said display data;
- means for receiving said data for storage in said register;
- a source of data and control signal; and
- means for applying said data and control signals to said controller, said controller being responsive to said control signals to selectively store said display data In said memory and sequentially switch said display data stored in selected ones of said registers to said display device, said means for applying comprising means for capacitively coupling said signals to said display device.

21. The electronic label system of claim 1 wherein said means for controlling includes means for magnetically, capacitively or inductively coupling signals to said controller without physical contact therewith.

22. The electronic label system of claim 1 wherein said first input means includes a receiving circuit for accepting radiated transmissions from said central controller.

23. The electronic label system of claim 22 wherein said second input means includes means for accepting data from said means for controlling without physical contact therewith.

24. The electronic label system of claim 21 wherein said second input means includes means for accepting data from said means for controlling without physical contact therewith.

* * * * *